Figure 1:
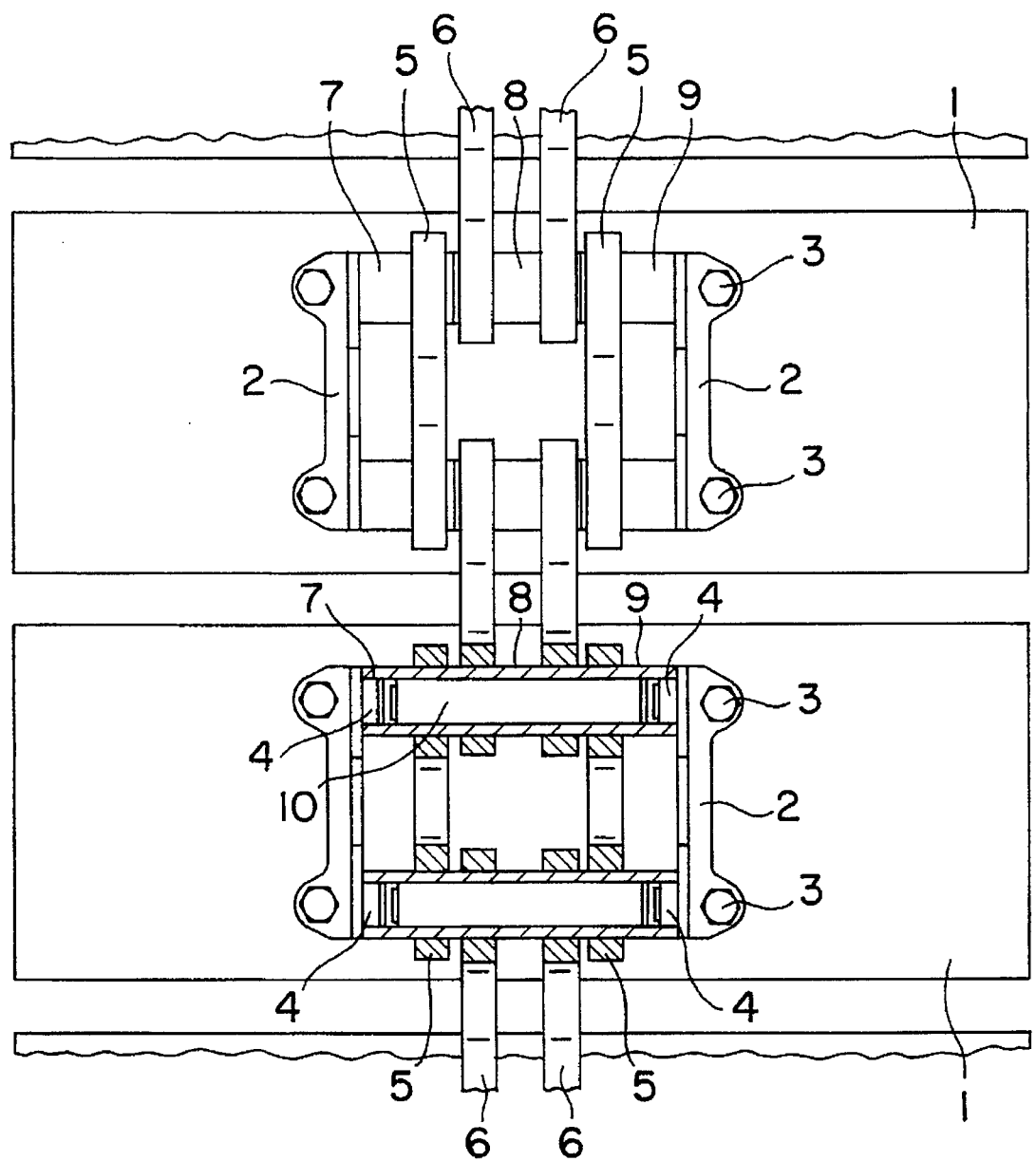

United States Patent [19]

Rieger et al.

[11] Patent Number: 5,626,220
[45] Date of Patent: May 6, 1997

[54] BUCKET CONVEYOR

[75] Inventors: Otto E. Rieger, Aalen-Unterkochen; Hans H. Dalferth, Aalen-Wasseralfingen; Zvonimir Bogdan, Aalen-Abstgmünd; Hartwig Zenker, Aalen-Ebnat, all of Germany

[73] Assignee: RUD Kettenfabrik Rieger & Dietz GmbH u. Co., Aalen-Unterkochen, Germany

[21] Appl. No.: 406,962

[22] PCT Filed: Sep. 29, 1993

[86] PCT No.: PCT/DE93/00927

§ 371 Date: Mar. 28, 1995

§ 102(e) Date: Mar. 28, 1995

[87] PCT Pub. No.: WO94/07778

PCT Pub. Date: Apr. 14, 1994

[30] Foreign Application Priority Data

Sep. 30, 1992 [DE] Germany ............... 42 33 552.3

[51] Int. Cl.⁶ .................................................. B65G 17/36
[52] U.S. Cl. ............................................................ 198/712

[58] Field of Search ........................................ 198/712, 853

[56] References Cited

U.S. PATENT DOCUMENTS

| 1,712,248 | 5/1929 | Brayton | 198/853 |
| 2,444,812 | 7/1948 | Crowley et al. | 198/712 |
| 5,123,524 | 6/1992 | Lapeyre | 198/853 |

FOREIGN PATENT DOCUMENTS

| 559458 | 9/1923 | France . |
| 1574132 | 7/1969 | France . |
| 3503302 | 8/1986 | Germany . |
| 3545634 | 6/1987 | Germany . |
| 545413 | 5/1942 | United Kingdom . |

*Primary Examiner*—Joseph E. Valenza
*Attorney, Agent, or Firm*—Mark P. Stone

[57] ABSTRACT

The invention concerns a bucket conveyor in which the outer and inner links (5, 6) of the sprocket chain are connected to the buckets (1) by connector bars (2) and bushings (7, 9) which are inserted into the outer links and which, in addition, enclose the ends of link pins (10) that carry the inner links (6) via a common bushing (8) associated with them.

20 Claims, 4 Drawing Sheets

BUCKET CONVEYOR

The invention relates to a bucket conveyor, in which the buckets are fastened by connector webs to a plate link chain exhibiting outer and inner link plates interconnected by chain pins and in which, in transverse bores of the inner link plates, there are pressed bearing bushes for the chain pins.

In a bucket conveyor of the considered type, known from DE 35 45 634 A1, the ends of the outer link plates of the plate link chain are mounted, on both sides of a bearing bush bearing the ends of the inner link plates, directly on a respective chain pin. The known arrangement cannot be fully satisfactory inasmuch as the eyes of the outer link plates, which eyes are formed by transverse bores and serve to receive the chain pin, do not have the same diameter as the eyes of the inner link plates, into which the bearing bushes mounted on the chain pins are pressed. The use of identical outer and inner link plates is consequently not considered in the known solution. Added to this is the fact that the outer link plates are supported only on a narrow region of the chain pins which corresponds to their own width and in which, when a press joint between the chain pins and the outer link plates is relinquished, which press joint makes fitting more difficult, increased wear phenomena result when rotary motions are induced in the chain pins, by the inner link plates, in the region of chain pulleys.

The object of the invention is to provide a bucket conveyor of the considered type which permits comfortable and rapid chain fitting and simple chain shortenings or extensions and in which the joints of the chains can be configured in a simple and low-wearing design. This object is achieved according to the invention by virtue of the fact that also the outer link plates are equipped with pressed-in bearing bushes and are connected by the latter to the connector webs. For the connection of the outer and inner link plates of the bucket conveyor according to the invention, simple cylindrical chain pins are even able to be used even when the connector webs are provided with bearing journals for the transportation of the buckets, since the bearing bushes of the outer link plates are doubly used, namely not only as a bearing, but additionally as a bridge between the chain pins and the connector webs. Since the pins are mounted throughout their length in bushes, they have low susceptibility to wear regardless of their rotatability relative to all the link plates. The use of identical link plates, i.e. ones which are cheap to manufacture in considerable numbers, is possible. The buckets can be fitted and removed rapidly and without special tools.

It is shown to be particularly advantageous if the chain pins are mounted rotatably in the bearing bushes both of the outer and inner link plates and if at least the bearing bushes for the outer link plates respectively protrude on both sides over the bores which enclose them. In this way, not only is the susceptibility to wear of the chain pins in the region of the outer link plates reduced, but also the tilt resistance of the outer link plates mounted loosely on the chain pins is increased.

Figure 2:
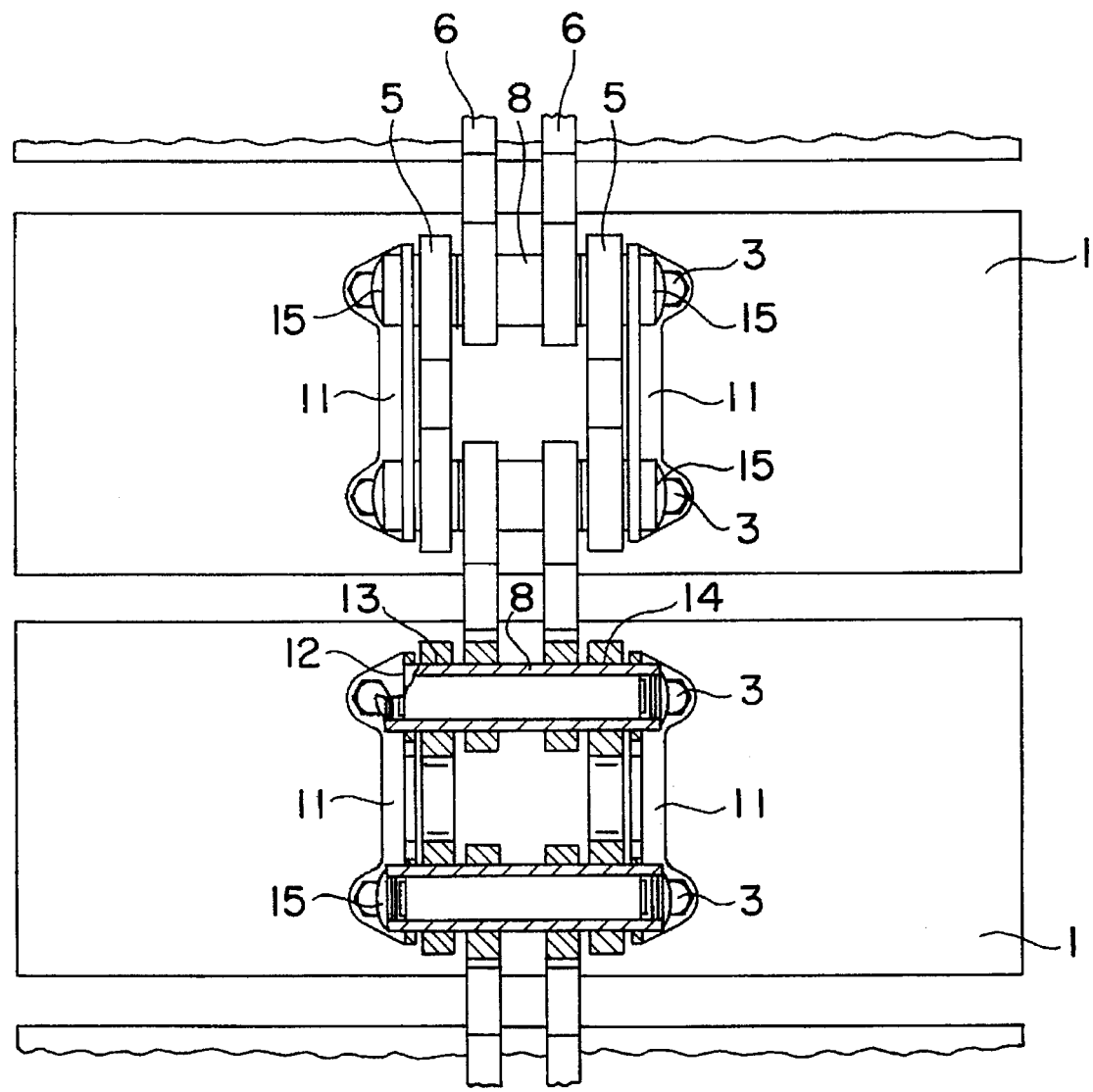
Figure 3:
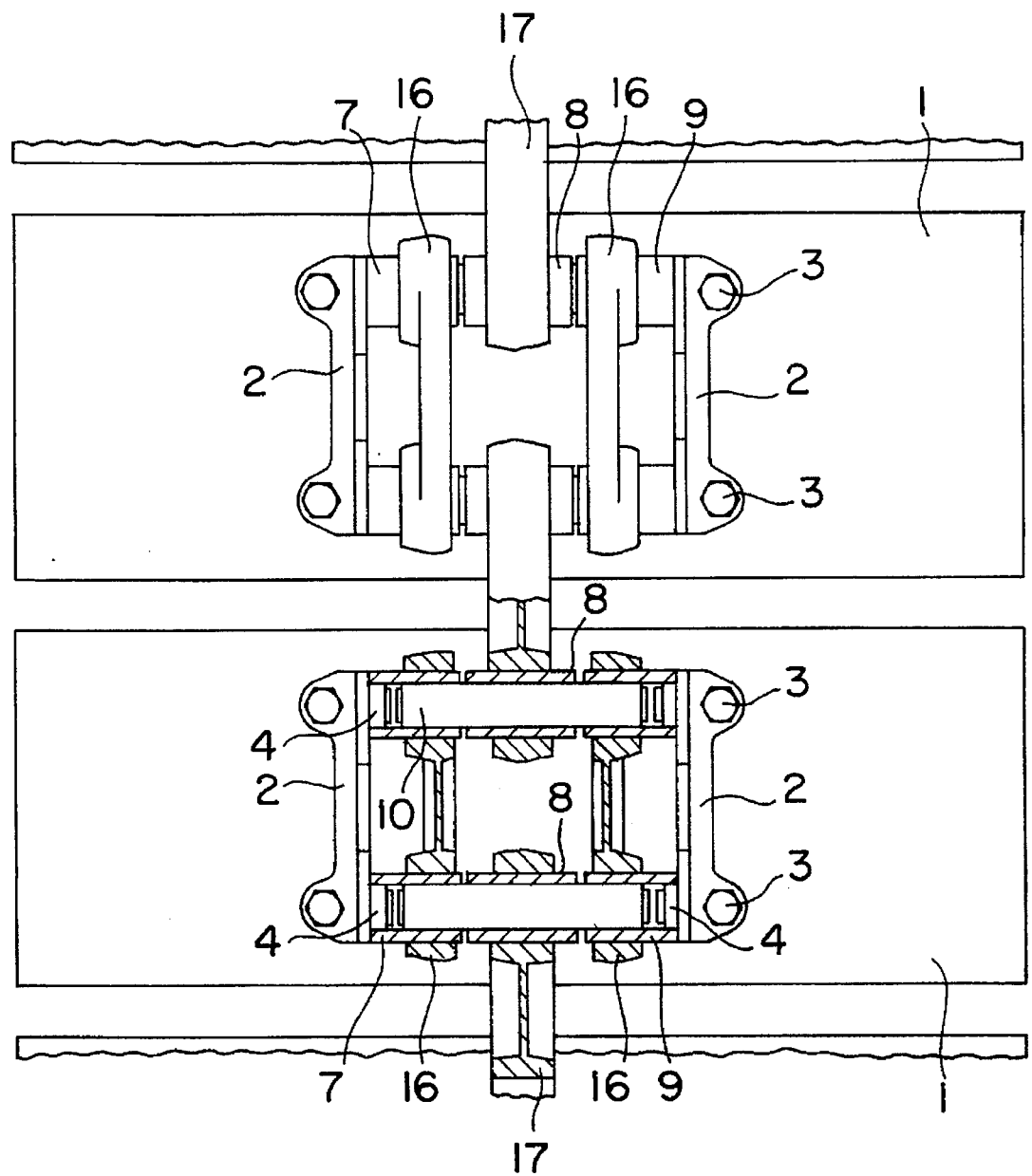
Figure 4:
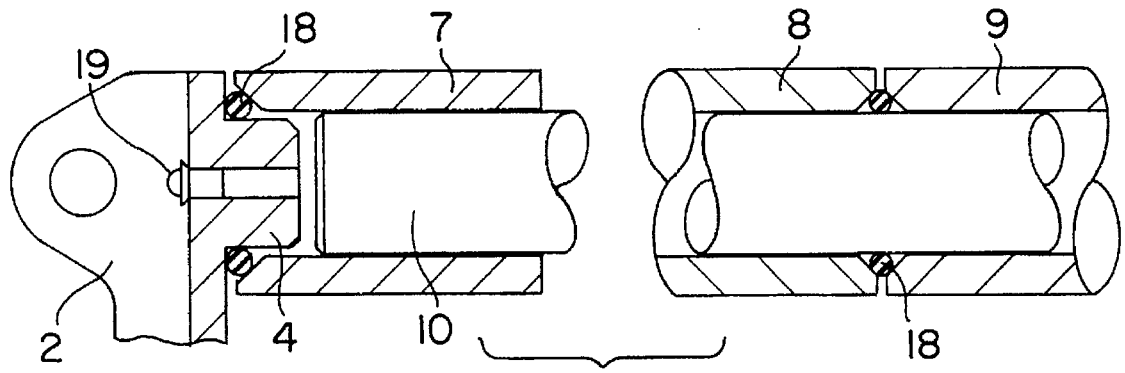
Figure 5:
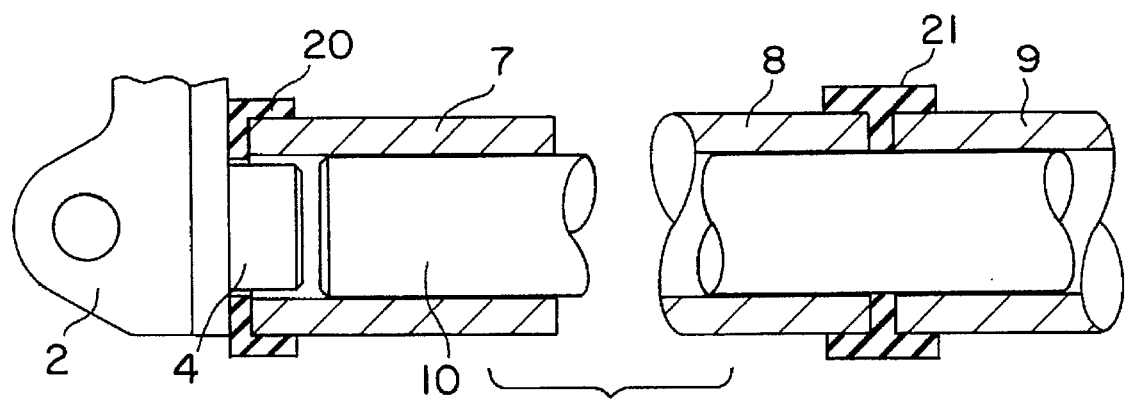
Figure 6:
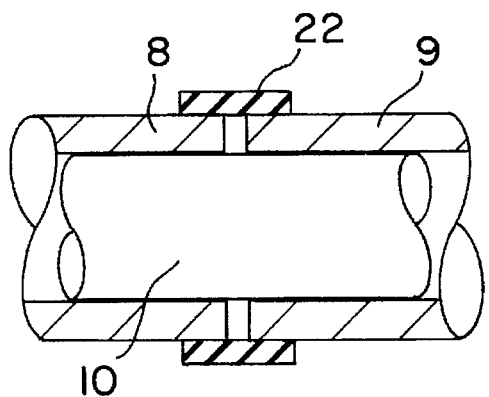

The invention is explained in greater detail below with reference to the appended drawing, in which:

FIG. 1 shows, partly in section, a portion of a first plate link chain, which portion is connected to the backs of buckets, FIG. 2 shows, partly in section, a portion of a second plate link chain, which portion is connected to the backs of buckets, FIG. 3 shows, partly in section, a portion of a third plate link chain, which portion is connected to the backs of buckets, FIG. 4 shows a sealing facility for the bearing bushes of the outer and inner link plates represented in FIG. 1, FIG. 5 shows a modified sealing facility, and FIG. 6 shows a particularly simple sealing facility for the bearing bushes enclosing the chain pins.

In FIG. 1, two consecutive buckets of a plate link chain bucket conveyor are denoted by 1. The connection of the buckets 1 to the plate link chain is served by angular connector webs 2, which are screwed to the bucket rear wall by means of screws 3. Each of the connector webs 2 is provided with two mutually spaced bearing journals 4, by which the buckets 1 are suspended from the plate link chain. The plate link chain comprises, in the represented case, outer link plates 5 and inner link plates 6, which are respectively disposed in pairs and in whose eyes formed by transverse bores there are pressed bearing bushes 7 to 9. The bearing bushes 7 to 9 have the same outer diameter, thereby making it possible to use identical inner and outer link plates 5, 6. All bearing bushes 7, 8 and 9 enclose in running fit, i.e. with appropriate play, a chain pin 10, which is consequently floatingly mounted in the region of the bearing bushes 7 to 9. As can particularly be seen from the lower part of FIG. 1, the bearing bushes 7 and 9 form bridges between the bearing journals 4 and the chain pins 10, the play between the bearing journals 4 and the bearing bushes 7 and 9 being greater than the play between the chain pins 10 and the bearing bushes 7 to 9.

The bucket-fitting, in a bucket conveyor of the described type, proves to be extremely simple. The buckets 1 can be supplied as units which have already been premounted with a connector web 2. The plate link chain comprises parts which have been premounted by being plugged together. When the buckets 1 are connected to the ready-fitted chain, the bearing journals 4 of the connector webs 2 already premounted to the buckets are fitted into the bearing bushes 7 provided for them. The respective second connector web 2 which is necessary for the fastening is next placed into the corresponding bearing bush 9 and the second connector web 2 is screwed to the bucket rear wall.

In FIG. 2, those parts which correspond to the embodiment according to FIG. 1 are provided with the same reference symbols as in FIG. 1. The connection of the buckets 1 to the plate link chain is here served by modified connector webs 11, which are again screwed tight to the respective bucket rear wall by means of screws 3. Each of the connector webs 11 exhibits two mutually spaced bores 12, in which the respectively outer ends of bearing bushes 13, 14 pressed into the eyes of the outer link plates 5 are mounted. In this case too, the bearing bushes 13, 14 have the same outer diameters as the bearing bushes 8 of the inner link plates 6, thereby enabling the use of identical outer and inner link plates 5, 6. The chain pins 10, as in the initially described embodiment, are mounted floatingly in the bearing bushes 8, 13, 14, the play between the chain pins 10 and the bearing bushes 8, 13, 14 here too being less than the play between the bearing bushes 13, 14 and the bores 12, so that there is no question of the connector webs 11 being subjected to stress by tensile forces generated in the chain. The outwardly directed openings of the bearing bushes 13, 14 of the outer link plates 5 are closed off by means of stoppers 15, which prevent dirt from penetrating into the bush ends.

FIG. 3 shows an embodiment which, in terms of the type of bucket suspension, broadly corresponds to the embodiment according to FIG. 1. In place of link plates made from flat steel, drop-forged outer and inner link plates 16, 17 are in this case used, to be precise the consecutive chain pins are alternately interconnected by, respectively, two identical outer link plates 16 and an inner link plate 17 which has been strengthened relative to the outer link plates 16.

In place of link plates which have been made from flat steel or drop-forged, use can also be made of link plates consisting of packs of stamped metal sheets, the pack thickness being able to be varied in accordance with the particular circumstances. It is likewise possible to configure the link plates as round steel links, as is known from plate link chains described in German Patent Specification 15 56 173.

FIGS. 4 to 6 show that the bearing bushes 7, 8, 9 facilitate sealing of the chain pins within them. In the embodiment according to FIG. 4, only the end faces of the bearing bushes 7–9 are slightly beveled on one side so as to be used as receiving fixtures for O-rings 18. Via a lubricating nipple 19, the bearings are able to be supplied with lubricating grease, should this be considered desirable. In the illustrative embodiment according to FIG. 5, special sealing rings 20 and 21 are used, whilst in the embodiment according to FIG. 4 a simple sleeve 22 is employed.

We claim:

1. A bucket conveyor, in which the buckets are fastened by connector webs to a plate link chain exhibiting outer and inner link plates interconnected by chain pins and in which, in transverse bores of the inner link plates, there are pressed bearing bushes for the chain pins, wherein also the outer link plates (5; 16) are equipped with pressed-in bearing bushes (7, 9; 13, 14) and are connected by the latter to the connector webs (2; 11).

2. The bucket conveyor as claimed in claim 1, wherein the chain pins (10) are mounted rotatably in the bearing bushes (7, 8, 9) both of the outer and inner link plates (5, 6).

3. The bucket conveyor as claimed in claim 1, wherein the bearing bushes (7, 9) of the outer link plates (5) enclose with their one end bearing journals (4) of the connector webs (2) and with their other end the chain pin (10) respectively assigned to them.

4. The bucket conveyor as claimed in claim 1, wherein the respectively outer ends of the bearing bushes (13, 14) of the outer link plates (5) form bearing journals which jut into bores (12) in the connector webs (11).

5. The bucket conveyor as claimed in claim 4, wherein the length of the chain pins (10) is greater than the distance between the connector webs (11) of a bucket.

6. The bucket conveyor as claimed in claim 4 wherein the outwardly directed openings of the bearing bushes (13, 14) of the outer link plates (5) are closed off by stoppers (15).

7. The bucket conveyor as claimed in claim 1, wherein at least the bearing bushes (7, 9; 13, 14) for the outer link plates (5; 16) respectively protrude on both sides over the transverse bores which enclose them of the outer link plates (5; 16).

8. The bucket conveyor as claimed in claim 1, wherein the chain pins (10) are mounted with play in the bearing bushes (7, 8, 9; 13, 8, 14) of the outer and inner link plates (5, 6; 16, 17).

9. The bucket conveyor as claimed in claim 1, wherein the outer and inner link plates (5, 6) are identically configured.

10. The bucket conveyor as claimed in claim 1, wherein the chain pins (10) are alternately interconnected by identical outer link plates (16) arranged in pairs and by individual inner link plates (17) which are offset relative to the outer link plates (16).

11. The bucket conveyor as claimed in claim 1, wherein both in the region of the joins between the mutually facing end faces of the bearing bushes (7, 8, 9) and in the region of the joins between the end faces of the bearing bushes (7, 9) and the connector webs (2), seals (18, 20–22) are disposed.

12. The bucket conveyor as claimed in claim 2, wherein the bearing bushes (7, 9) of the outer link plates (5) enclose with their one end bearing journals (4) of the connector webs (2) and with their other end the chain pin (10) respectively assigned to them.

13. The bucket conveyor as claimed in claim 2, wherein the respectively outer ends of the bearing bushes (13, 14) of the outer link plates (5) form bearing journals which jut into bores (12) in the connector webs (11).

14. The bucket conveyor as claimed in claim 13, wherein the length of the chain pins (10) is greater than the distance between the connector webs (11) of a bucket.

15. The bucket conveyor as claimed in claim 13, wherein the outwardly directed openings of the bearing bushes (13, 14) of the outer link plates (5) are closed off by stoppers (15).

16. The bucket conveyor as claimed in claim 2, wherein at least the bearing bushes (7, 9; 13, 14) for the outer link plates (5; 16) respectively protrude on both sides over the transverse bores which enclose them of the outer link plates (5; 16).

17. The bucket conveyor as claimed in claim 2, wherein the chain pins (10) are mounted with play in the bearing bushes (7, 8, 9; 13, 8, 14) of the outer and inner link plates (5, 6; 16, 17).

18. The bucket conveyor as claimed in claim 2, wherein the outer and inner link plates (5, 6) are identically configured.

19. The bucket conveyor as claimed in claim 2, wherein the chain pins (10) are alternately interconnected by identical outer link plates (16) arranged in pairs and by individual inner link plates (17) which are offset relative to the outer link plates (16).

20. The bucket conveyor as claimed in claim 2, wherein both in the region of the joins between the mutually facing end faces of the bearing bushes (7, 8, 9) and in the region of the joins between the end faces of the bearing bushes (7, 9) and the connector webs (2), seals (18, 20–22) are disposed.

* * * * *